United States Patent
Yao et al.

(10) Patent No.: US 7,312,956 B2
(45) Date of Patent: Dec. 25, 2007

(54) MICRO-ACTUATOR, HEAD GIMBAL ASSEMBLY, AND DISK DRIVE UNIT WITH THE SAME

(75) Inventors: MingGao Yao, DongGuan (CN); Masashi Shiraishi, HongKong (CN)

(73) Assignee: SAE Magnetics (H.K.) Ltd, Hong Kong (CN)

(*) Notice: Subject to any disclaimer, the term of this patent is extended or adjusted under 35 U.S.C. 154(b) by 344 days.

(21) Appl. No.: 10/935,148

(22) Filed: Sep. 8, 2004

(65) Prior Publication Data

US 2006/0050442 A1    Mar. 9, 2006

(51) Int. Cl.
*G11B 5/56* (2006.01)
*G11B 21/24* (2006.01)

(52) U.S. Cl. .................. 360/294.4; 360/294.1; 360/294.2; 360/294.3; 360/294.5

(58) Field of Classification Search .............. 360/294.4
See application file for complete search history.

(56) References Cited

U.S. PATENT DOCUMENTS

| | | | |
|---|---|---|---|
| 5,243,482 A * | 9/1993 | Yamaguchi et al. ..... | 360/245.4 |
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,215,629 B1 * | 4/2001 | Kant et al. ................. | 360/290 |
| 6,297,936 B1 * | 10/2001 | Kant et al. ............... | 360/294.4 |
| 6,320,730 B1 * | 11/2001 | Stefansky et al. ....... | 360/294.4 |
| 6,362,939 B1 * | 3/2002 | Crane et al. ............. | 360/294.5 |
| 6,376,964 B1 * | 4/2002 | Young et al. ............. | 310/311 |
| 6,538,836 B1 | 3/2003 | Dunfield et al. | |
| 6,538,854 B2 * | 3/2003 | Koganezawa et al. ... | 360/294.4 |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,760,196 B1 * | 7/2004 | Niu et al. ................. | 360/294.6 |
| 6,927,945 B2 * | 8/2005 | Yao et al. ................. | 360/294.3 |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—Angel Castro
*Assistant Examiner*—Christopher R. Magee
(74) *Attorney, Agent, or Firm*—Nixon & Vanderhye, PC

(57) ABSTRACT

A head gimbal assembly includes a slider, a rotatable micro-actuator and a suspension to load the slider and the rotatable micro-actuator. The rotatable micro-actuator horizontally rotates the slider with a central portion of the slider as an axis, which includes a bottom plate to be connected with the suspension, two arm plates symmetrically disposed on the bottom plate with a central portion of the bottom plate as symmetry point and at least one piezoelectric pieces to be connected with the arm plates. Selectively, the amount of the arm plates can be four and four piezoelectric pieces to be connected with the four arm plates, respectively.

21 Claims, 14 Drawing Sheets

U.S. PATENT DOCUMENTS

| | | |
|---|---|---|
| 6,930,860 B1 * | 8/2005 | Coffey ............... 360/294.4 |
| 6,950,266 B1 | 9/2005 | McCaslin et al. |
| 6,961,221 B1 * | 11/2005 | Niu et al. ............ 360/294.4 |
| 7,057,857 B1 * | 6/2006 | Niu et al. ............ 360/245.4 |
| 7,099,115 B2 * | 8/2006 | Yao et al. ............ 360/244.7 |
| 2003/0147177 A1 | 8/2003 | Yao et al. |
| 2003/0147181 A1 | 8/2003 | Shiraishi et al. |
| 2003/0168935 A1 | 9/2003 | Ogawa et al. |
| 2004/0125510 A1 * | 7/2004 | Yang et al. ........... 360/294.4 |
| 2006/0023338 A1 | 2/2006 | Sharma et al. |
| 2006/0050442 A1 | 3/2006 | Yao et al. |
| 2006/0072247 A1 | 4/2006 | Yao et al. |
| 2006/0082917 A1 | 4/2006 | Yao et al. |
| 2006/0098347 A1 | 5/2006 | Yao et al. |
| 2006/0146449 A1 | 7/2006 | Yao et al. |

FOREIGN PATENT DOCUMENTS

| JP | 2002-133803 | 5/2002 |
|---|---|---|

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

MICRO-ACTUATOR, HEAD GIMBAL ASSEMBLY, AND DISK DRIVE UNIT WITH THE SAME

FIELD OF THE INVENTION

The present invention relates to disk drive units, and particularly relates to a micro-actuator, and a head gimbal assembly using the micro-actuator.

BACKGROUND OF THE INVENTION

Disk drives are information storage devices that use magnetic media to store data. Referring to FIG. 1a, a typical disk drive in related art has a magnetic disk and a drive arm to drive a head gimbal assembly 277 (HGA) (the HGA 277 has a suspension (not labeled) with a slider 203 mounted thereon). The disk is mounted on a spindle motor which causes the disk to spin and a voice-coil motor (VCM) is provided for controlling the motion of the drive arm and thus controlling the slider 203 to move from track to track across the surface of the disk to read data from or write data to the disk.

However, Because of the inherent tolerance resulting from VCM and the suspension that exists in the displacement (off track) of the slider 203, the slider 203 can not attain a fine position control which will affect the slider 203 to read data from and write data to the magnetic disk.

To solve the above-mentioned problem, piezoelectric (PZT) micro-actuators are now utilized to modify the displacement of the slider 203. That is, the PZT micro-actuator corrects the displacement of the slider 203 on a much smaller scale to compensate for the resonance tolerance of the VCM and the suspension. It enables a smaller recording track width, increases the 'tracks per inch' (TPI) value by 50% of the disk drive unit (it is equivalent to increase the surface recording density).

Referring to FIG. 1b, a traditional PZT micro-actuator 205 comprises a ceramic U-shaped frame 297 which comprises two ceramic beams 207 with two PZT pieces (not labeled) on each side thereof. With reference to FIGS. 1a and 1b, the PZT micro-actuator 205 is physically coupled to a suspension 213, and there are three electrical connection balls 209 (gold ball bonding or solder ball bonding, GBB or SBB) to couple the micro-actuator 205 to the suspension traces 210 in each one side of the ceramic beam 207. In addition, there are four metal balls 208 (GBB or SBB) to couple the slider 203 to the suspension 213 for electrical connection. FIG. 1c shows a detailed process of inserting the slider 203 into the micro-actuator 205. The slider 203 is bonded with the two ceramic beams 207 at two points 206 by epoxy dots 212 so as to make the motion of the slider 203 dependent of the ceramic beams 207 of the micro-actuator 205.

When power supply is applied through the suspension traces 210, the PZT pieces of the micro-actuator 205 will expand or contract to cause two ceramic beams 207 of the U-shaped frame 297 deform and then make the slider 203 move on the track of the disk. Thus a fine head position adjustment can be attained.

However, because the PZT micro-actuator 205 and the slider 203 are mounted on the suspension tongue (not labeled), when the PZT micro-actuator 205 is excited, it will do a pure translational motion to sway the slider 203 due to the constraint of U-shaped frame 297 of the micro-actuator 205, and cause a suspension vibration resonance which has a same frequency as the suspension base plate. This will limit the servo bandwidth and the capacity improvement of HDD. As shown in FIG. 2, numeral 201 represents a resonance curve when shaking the suspension base plate and numeral 202 represents a resonance curve when exciting the micro-actuator 205. The figure clearly shows the above-mentioned problem.

Hence, it is desired to provide a micro-actuator, head gimbal assembly, disk drive to solve the above-mentioned problems.

SUMMARY OF THE INVENTION

A main feature of the present invention is to provide a micro-actuator and a HGA which can attain a fine head position adjustment and a good resonance performance when exciting the micro-actuator.

Another feature of the present invention is to provide a disk drive unit with big servo bandwidth and head position adjustment capacity.

To achieve the above-mentioned features, a HGA of the present invention comprises a slider, a rotatable micro-actuator; and a suspension to load the slider and the rotatable micro-actuator. The rotatable micro-actuator horizontally rotates the slider with a central portion of the slider as an axis.

In an embodiment, the rotatable micro-actuator of the present invention comprises a bottom plate to be connected with the suspension; two arm plates symmetrically disposed on the bottom plate with a central portion of the bottom plate as symmetry point; and at least one piezoelectric pieces to be connected with the arm plates. In another embodiment, the rotatable micro-actuator of the present invention comprises a bottom plate to be connected with the suspension; four arm plates symmetrically disposed on the bottom plate with a central portion of the bottom plate as symmetry point; and four piezoelectric pieces to be connected with the arm plates, respectively. In the present invention, the arm plates are perpendicularly connected with the bottom plate. Each of arm plates has a free end and an end to connect with the bottom plate. In the present invention, the slider is partially bonded with the rotatable micro-actuator, for example, the slider is bonded with the free ends of the arm plates by its two opposing side surface, one is trailing edge side surface and the other is leading edge side surface. In addition, a parallel gap exists between the suspension and the bottom plate.

In the present invention, the bottom plate is connected with the suspension by epoxy, adhesive, ACF or laser welding. The at least one piezoelectric pieces are thin film piezoelectric pieces or ceramic piezoelectric pieces, which are electrically bonded with the suspension by gold ball bonding, solder ball bonding or conductive adhesive. As an embodiment, the at least one piezoelectric pieces have a single layer structure or a multi-layer structure comprising a substrate layer and a piezoelectric layer. The piezoelectric layer is a single-layer PZT structure or a multi-layer PZT structure, the substrate layer is made of metal, ceramic, or polymer. The at least one piezoelectric pieces may also have a single-segment structure or a multi-segment structure.

A disk drive unit of the present invention comprises a HGA, a drive arm to connect with the head gimbal assembly; a disk; and a spindle motor to spin the disk. The HGA comprises a slider, a rotatable micro-actuator; and a suspension to load the slider and the rotatable micro-actuator; wherein the rotatable micro-actuator horizontally rotates the slider with a central portion of the slider as an axis.

Compared with the prior art, the micro-actuator of the invention can rotate both trailing side and leading side of the slider in different directions so as to make the slider get a bigger swing. Accordingly, a big head position adjustment capacity can be attained. In addition, because the slider is partially bonded with the rotatable micro-actuator and suspended on the bottom plate of the rotatable micro-actuator, when the micro-actuator is excited, it will rotate and cause the slider to rotate so as to attain a fine head position adjustment. Furthermore, a suspension resonance has not happened in a low frequency, but only a pure micro-actuator resonance happened in a high frequency, this would enlarge the servo bandwidth and then improve the capacity of the HDD. Finally, the structure of the rotatable micro-actuator will make the head position adjustment of the slider more freely.

For the purpose of making the invention easier to understand, several particular embodiments thereof will now be described with reference to the appended drawings in which:

DESCRIPTION OF THE DRAWINGS

FIG. 1b is an enlarged, partial view of FIG. 1a;

FIG. 1c shows a detailed process of inserting a slider to a micro-actuator of the HGA in FIG. 1a;

FIG. 2 shows a resonance curve of the HGA of FIG. 1a;

DETAILED DESCRIPTION OF THE INVENTION

Figure 1A:
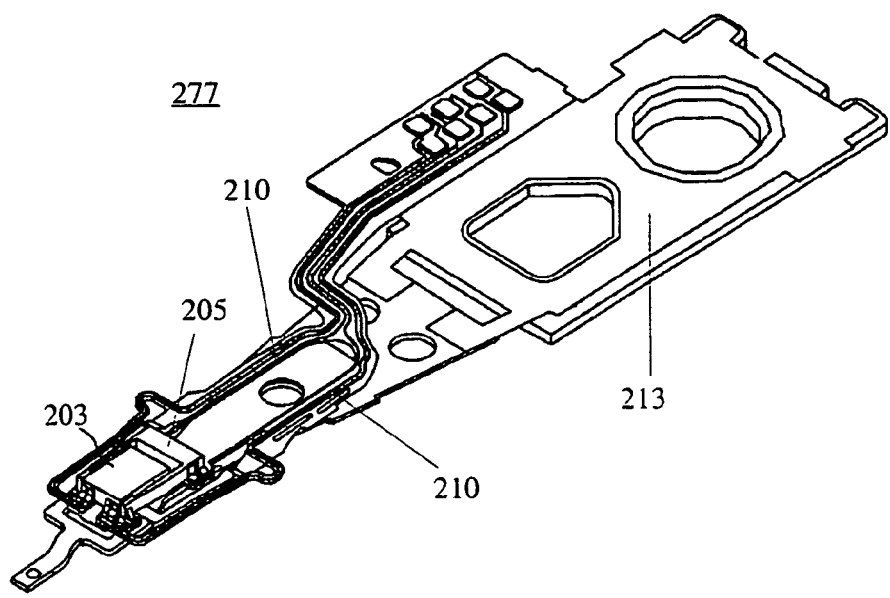
FIG. 1a is a perspective view of a HGA of related art.
Figure 1B:
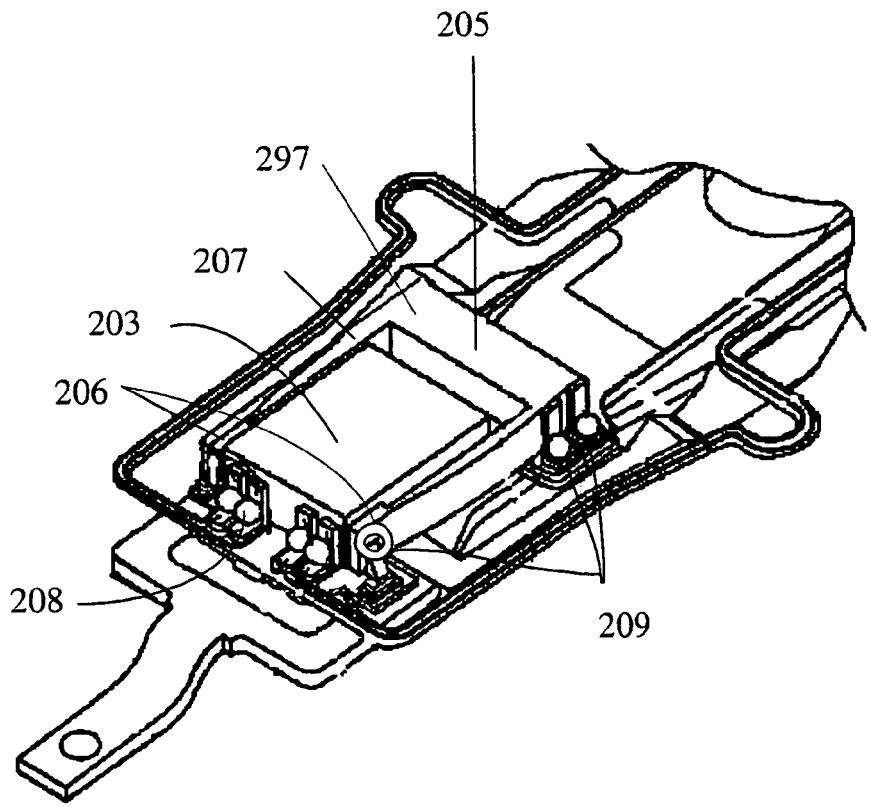
Figure 1C:
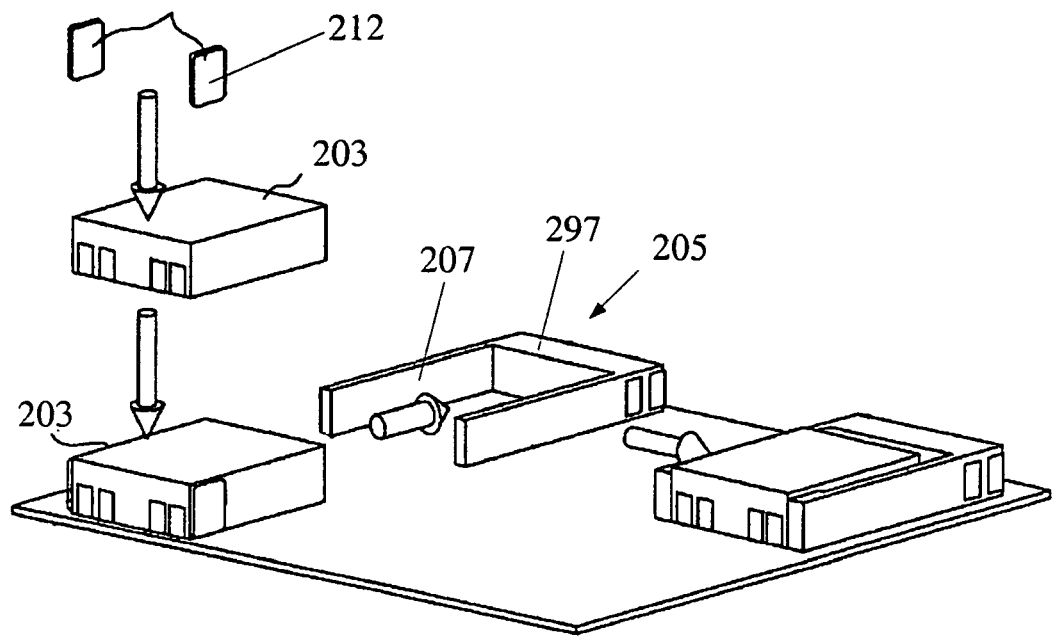
Figure 2:
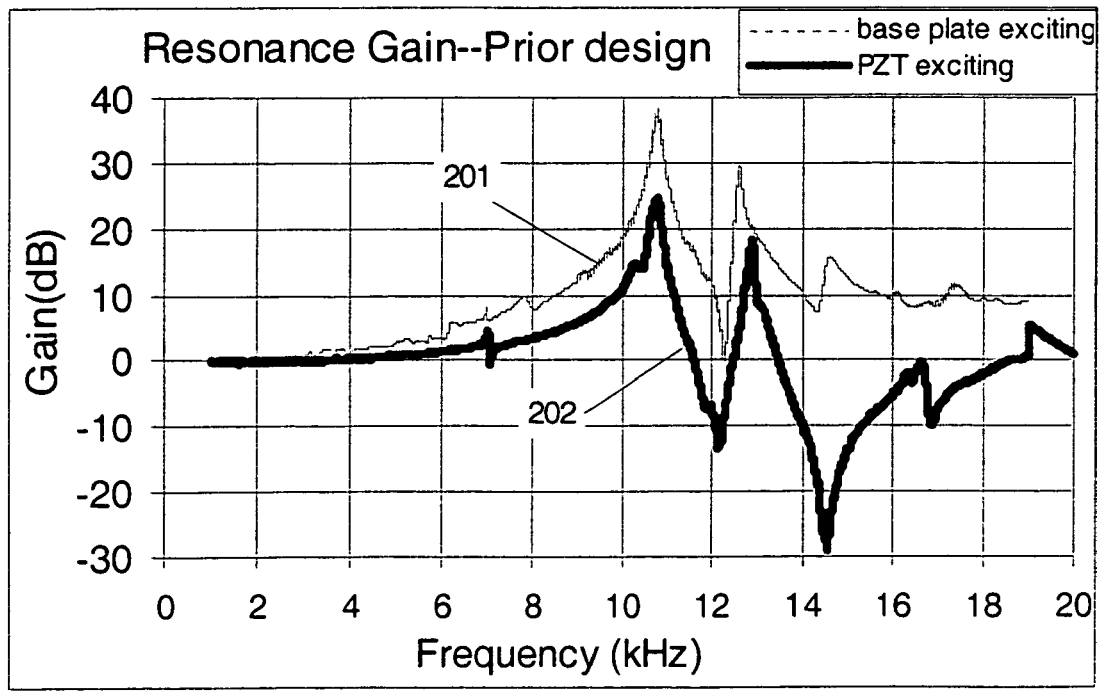
Figure 3:
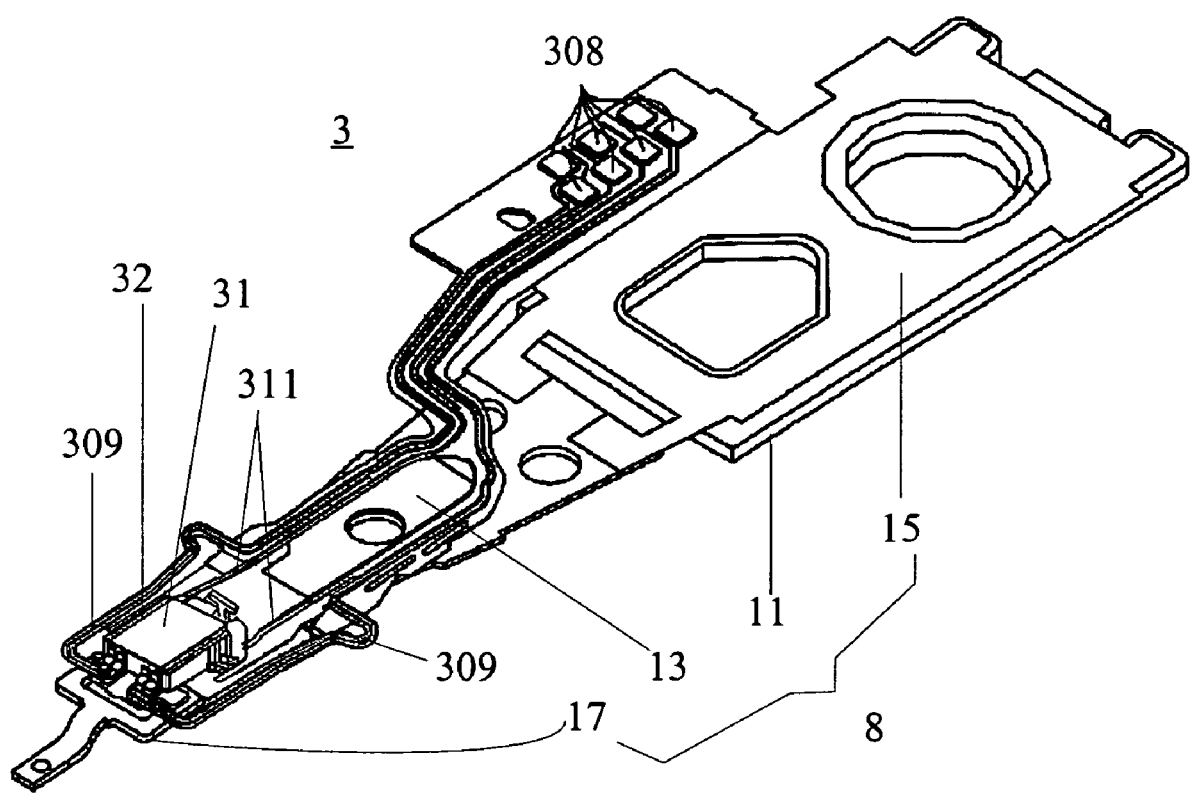
FIG. 3 is a perspective view of a HGA according to a first embodiment of the present invention.

Referring to FIG. 3, a head gimbal assembly (HGA) 3 of the present invention comprises a slider 31, a micro-actuator 32 and a suspension 8 to load the slider 31 and the micro-actuator unit 32.

Figure 4:
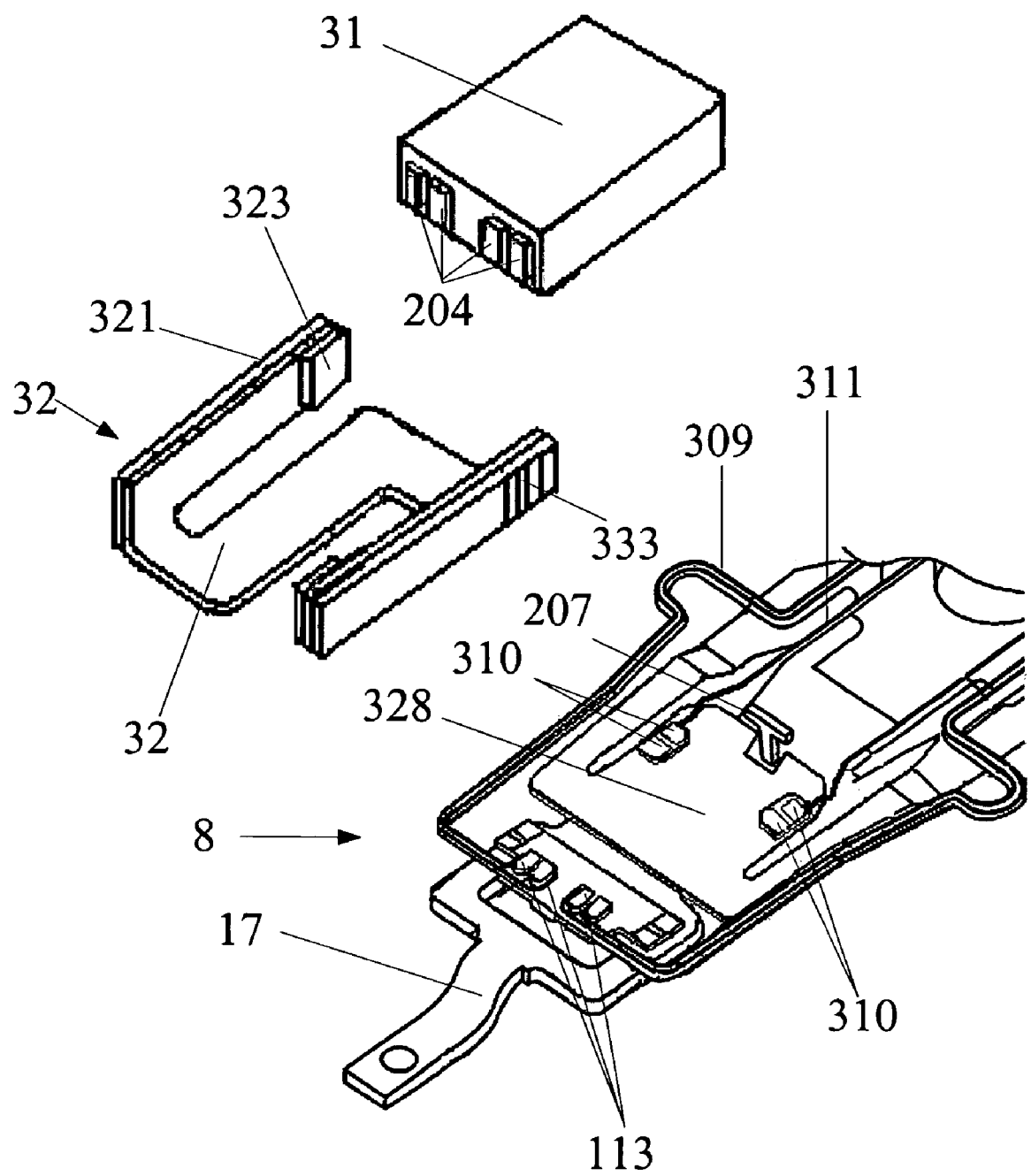
FIG. 4 is an enlarged, exploded partial perspective view of the HGA of FIG. 3.
Figure 5:
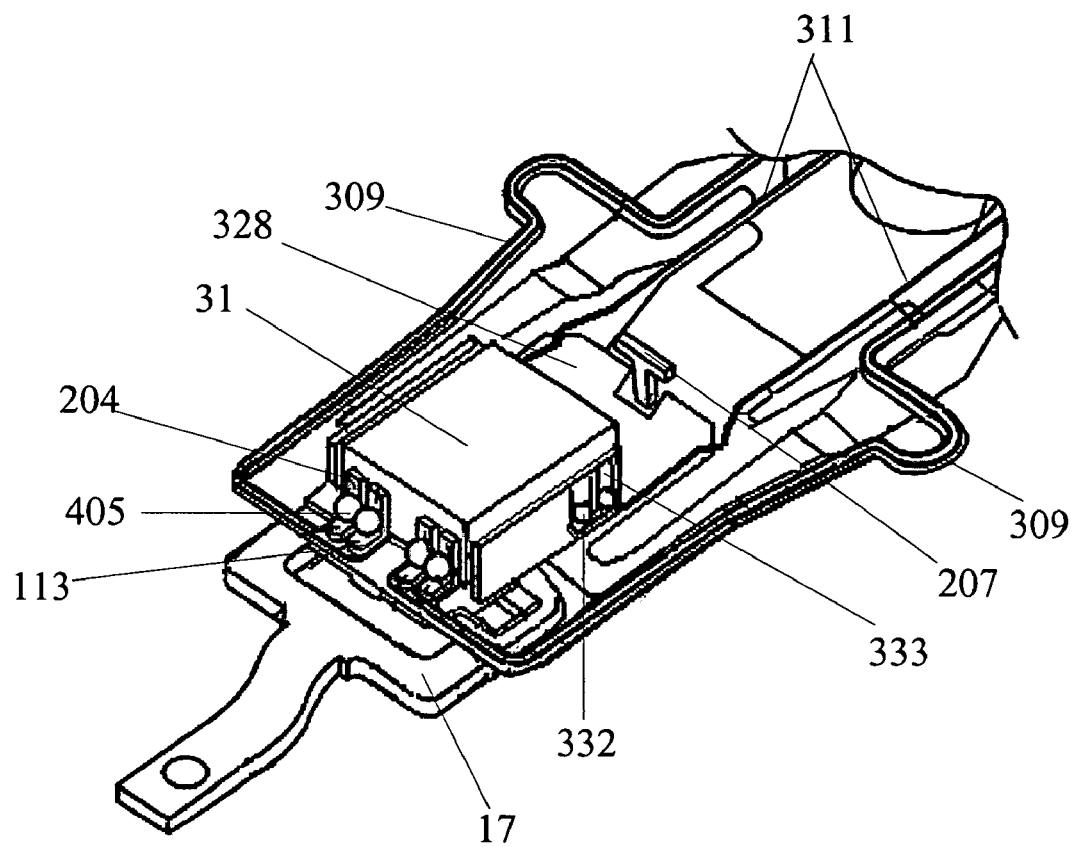
FIG. 5 is an enlarged, partial perspective view of the assembled HGA of FIG. 3.

Also referring to FIG. 3, the suspension 8 comprises a load beam 17, a flexure 13, a hinge 15 and a base plate 11. The load beam 17 has a plurality of dimples 329 (see FIG. 6) formed thereon. On the flexure 13 a plurality of connection pads 308 are provided to connect with a control system (not shown) at one end and a plurality of electrical multi-traces 309, 311 is provided in the other end. Referring to FIGS. 4 and 5, the flexure 13 also comprises a suspension tongue 328 which are used to support the micro-actuator 32 and the slider 31, and keep the loading force always being applied to the center area of the slider 31 through the dimples 329 of the load beam 17.

Figure 6:
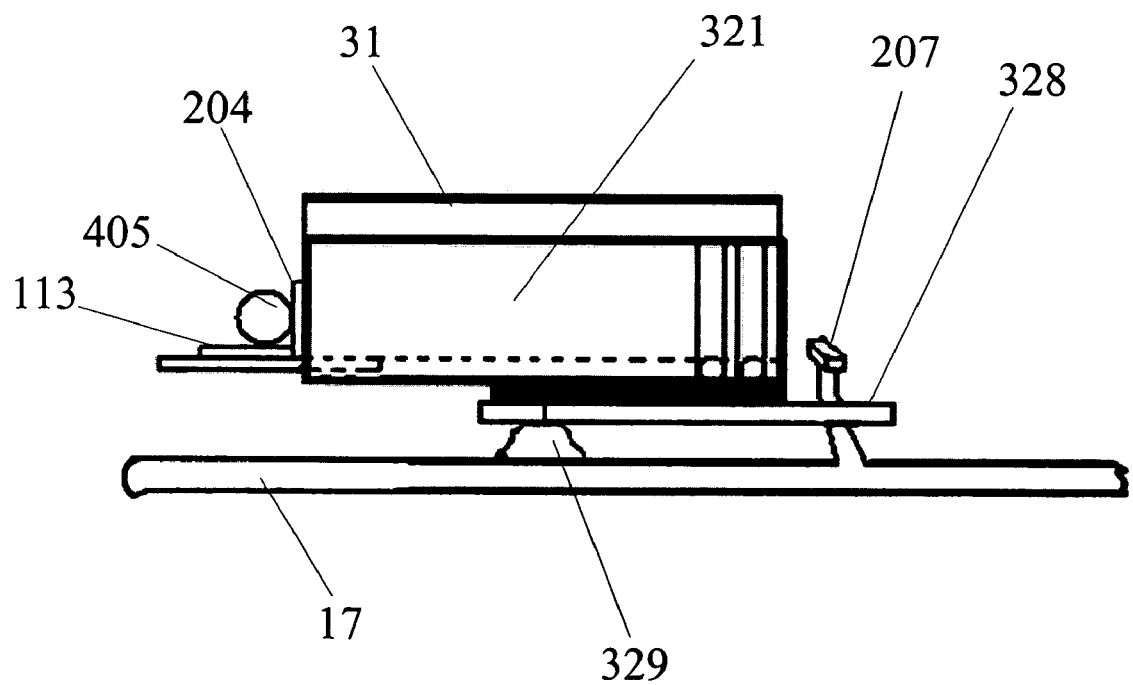
FIG. 6 is a partial, side view of the HGA of FIG. 3 in the micro-actuator area.

Referring to FIGS. 4-6, a limiter 207 is formed on the load beam 17 which extends through the suspension tongue 328 for preventing the suspension tongue 328 from being bent overly during normal operation of disk drive or any shock or vibration happening to the disk drive. The suspension tongue 328 has a plurality of electrical bonding pads 113 and 310 formed thereon. The slider 31 has a plurality of electrical bonding pads 204 on an end thereof corresponding to the electrical bonding pads 113 of the suspension tongue 328.

Figure 7:
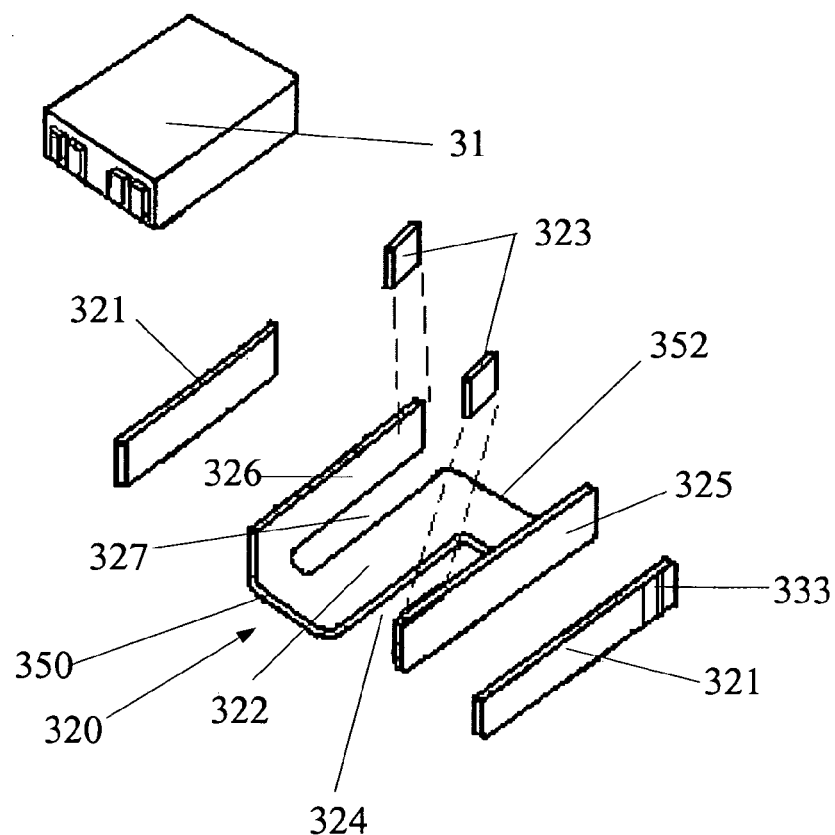
FIG. 7 is an exploded, perspective view of the micro-actuator and a slider of the HGA in FIG. 3 according to a first embodiment of the present invention.

Referring to the FIG. 7, according to a first embodiment of the invention, the micro-actuator 32 comprises a support frame 320 with a spring structure and two PZT pieces 321. The support frame 320 can be made of metal (i.e. stainless steel), ceramic or polymer, which comprises a bottom plate 322 and two side plates 325, 326 which vertically extend from two sides of the bottom plate 322. The bottom plate 322 have two ends 350 and 352, and a notch 324 starting from the end 350 is formed on a connecting portion between the bottom plate 322 and the side plate 325, while a notch 327 starting from the end 352 is formed on a connecting portion between the bottom plate 322 and the side plate 326. The two PZT pieces 321 are preferably made of thin film PZT material which can be a single-layer PZT element or a multi-layer PZT element. Also, the two PZT pieces 321 can be made of ceramic PZT material which can be a single-layer PZT element or a multi-layer PZT element. The two PZT pieces 321 are bonded with the support frame 320 by traditional bonding method, such as epoxy bonding, anisotropic conductive film (ACF), and each of the PZT pieces 321 has a plurality of electrical bonding pads 333 corresponding to the electrical bonding pads 310 (see FIG. 4).

Figure 8:
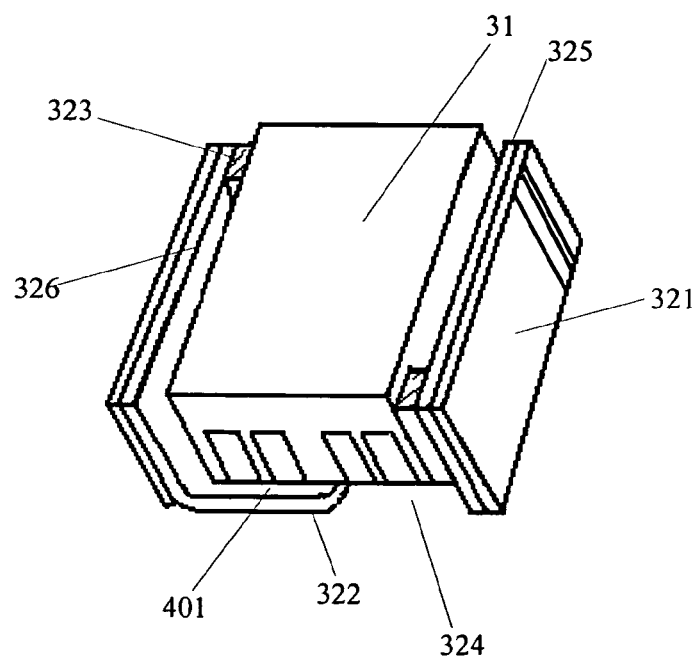
FIG. 8 shows the assembled micro-actuator and the slider of FIG. 7.
Figure 9:
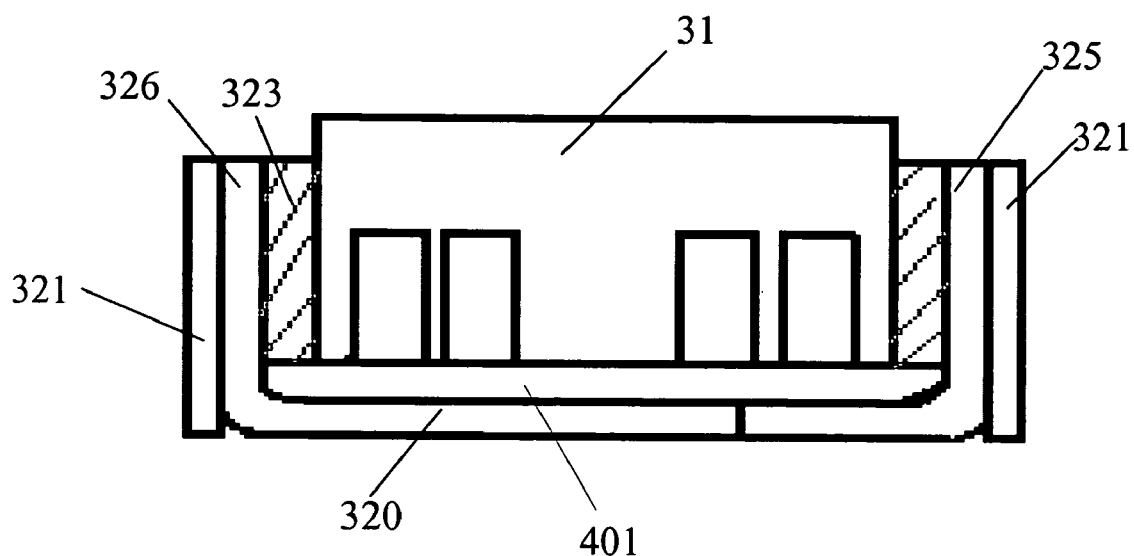
FIG. 9 is a side view of FIG. 8.

Also referring to FIGS. 7-9, the slider 31 is partially coupled with the support frame 320 by two epoxy dots 323, in an embodiment, one epoxy dot 323 is positioned on an end of the side plate 325 adjacent to the end 350 of the support frame 320, and the other is positioned on an end of the side plate 326 adjacent to the end 352 of the support frame 320. In addition, there is a parallel gap 401 formed between the slider 31 and the support frame 320. Here, because the slider 31 has a partial bonding method with the support frame 320 and a parallel gap 401 forming therebetween, the slider 31 will move smoothly when being driven by the micro-actuator 302.

Referring to FIGS. 4-6, in an embodiment of the present invention, the two PZT pieces 321 are bonded with the support frame 320 to form the micro-actuator 32; then, the slider 31 is coupled with the micro-actuator 32; after that, the slider 31 and the micro-actuator 32 are mounted on the suspension 8 to form the HGA 3 as follows: firstly, the support frame 320 is partially coupled with the suspension tongue 328 of the flexure 13 by laser welding, ACF, adhesive or epoxy; then, a plurality of metal balls 332 (GBB, SBB or conductive adhesive) are used to electrically connects the electrical bonding pads 333 of the two PZT pieces 321 of the micro-actuator 32 with the electrical bonding pads 310 of the suspension tongue 328 so as to electrically connect the micro-actuator 32 with the two electric multi-traces 311 of the suspension 8. Simultaneously, a plurality of metal balls 405 are used to electrically connect the electrical bonding pads 204 of the slider 31 with the electrical bonding pads 113 so as to electrically connect the slider 31 with the electric multi-traces 309. Through the electric multi-traces 309, 311, the connection pads 308 electrically connect the slider 31 and the micro-actuator 32 with the control system (not shown). Obviously, the assembly of the HGA 3 can also be performed as follows: firstly, coupling the micro-actuator 32 with the suspension 8, and then mounting the slider on the micro-actuator 32.

Figure 10A:
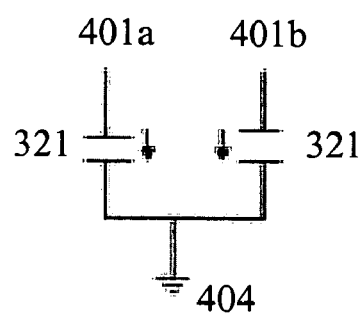
FIG. 10a shows an electrical connection relationship of two PZT pieces of the micro-actuator of FIG. 8, which have a same polarization direction according to an embodiment of the present invention.
Figure 10B:
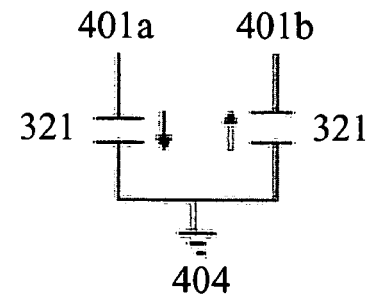
FIG. 10b shows an electrical connection relationship of two PZT pieces of the micro-actuator unit of FIG. 8, which have opposing polarization directions according to another embodiment of the present invention.
Figure 10C:
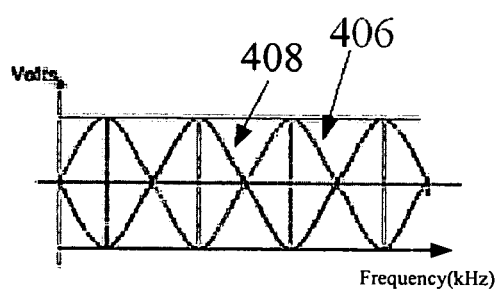
FIG. 10c shows two waveforms of voltages which are applied to the two PZT pieces of FIG. 10b, respectively.
Figure 10D:
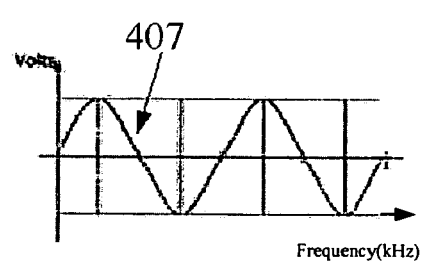
FIG. 10d shows a waveform of voltage which is applied to the two PZT pieces of FIG. 10a, respectively.
Figure 10E:
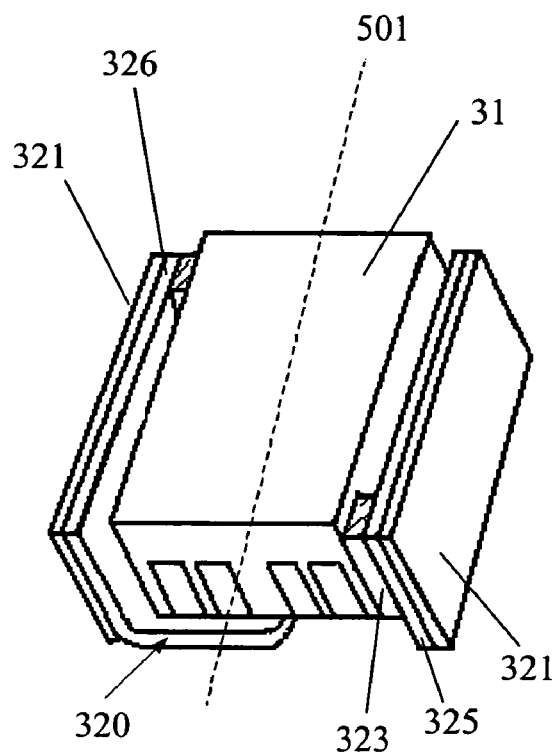
FIG. 10e show an initial status of the micro-actuator and the slider when no voltage is applied to the micro-actuator.
Figure 10F:
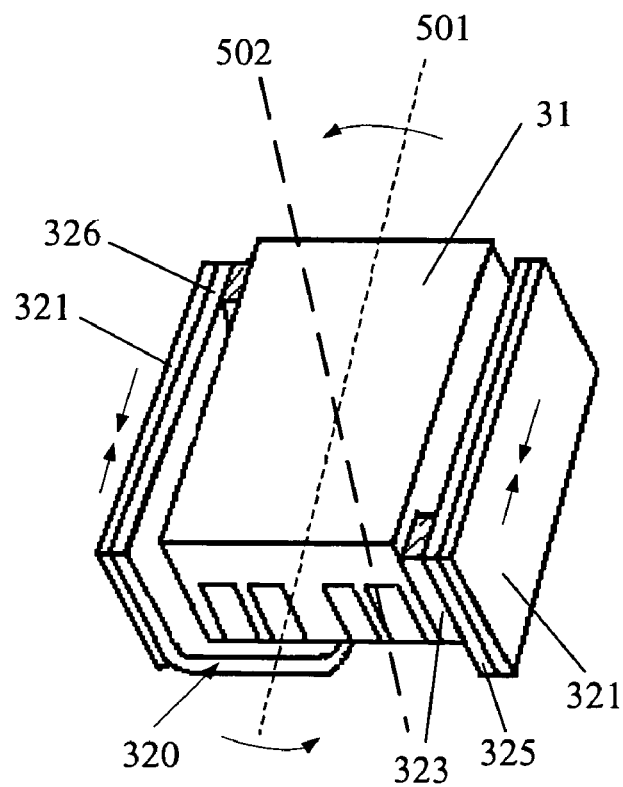
FIGS. 10f and 10g show two different operation methods of the two PZT pieces in FIG. 10a or 10b which causes the slider to rotate in a direction parallel to disk surface.
Figure 10G:
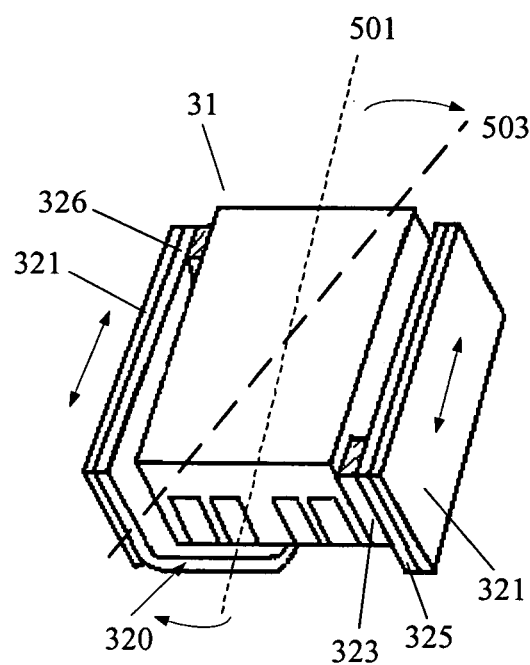

FIGS. 10a, 10d, 10e, 10f and 10g show a first operation method of the micro-actuator 32 for performing a position adjustment function. In the embodiment, the two PZT pieces 321 have a same polarization direction, as shown in FIG. 10a, which are common grounded by one end 404 and the other ends 401a and 401b thereof are applied two voltages with a same sine waveform 407 (see FIG. 10d). FIG. 10e shows an initial status of the micro-actuator 32 when no voltage is applied to the PZT pieces 321 of the micro-actuator 32. When the sine voltage 407 is applied to the two PZT pieces 321, in a first half period, both PZT pieces 321 will contract gradually till to a shortest position (corresponding to a largest displacement position) with the drive voltage increasing, and then gradually spring back till to its original location with the drive voltage reducing. In the first half period, when the drive voltage increases, the left side plate 326 will be bent by the PZT piece 321 to left side and the right side plate 325 will be bent by the PZT piece 321 to right side; when the drive voltage reduces, both side plates 325, 326 will return back to its original positions. In the present invention, the side plates 325, 326 of the support frame 320 will generate a rotate torque when being bent. In the present invention, because the slider 31 is partially mounted on the support frame 320 by two epoxy dots 323 and a parallel gap 401 forming therebetween, the slider 31 may rotate from an original axis 501 to a largest displacement location 502 and then back to its original location 501 under the rotate torque of the support frame 320, as shown in FIG. 10f. When the drive voltage goes down to a second half period (having an opposed phase with the first half period), both PZT pieces 321 will expand gradually till to a biggest displacement position with the negative drive voltage increasing, and then gradually back to its original location with the drive voltage reducing. Similarly, it will cause both side plates 325, 326 to bent and then back to its original position. In the present invention, the side plates 325, 326 of the support frame 320 will generate a rotate torque when being bent. Under the rotate torque of the support frame 320, the slider 31 may rotate from an original axis 501 to a largest displacement location 503 and then back to its original location 501 because the slider 31 is partially bonded with the support frame 320 by two epoxy dots 323 and a parallel gap 401 forming therebetween, as shown in FIG. 10g. Thus a head position adjustment can be attained.

FIGS. 10b, 10c, 10e, 10f and 10g show another operation method of the two PZT pieces 321 for performing head position adjustment function. In the embodiment, the two PZT pieces 321 have two opposing polarization directions, as shown in FIG. 10b, which are also common grounded by one end 404 and the other ends 401a and 401b thereof are applied two voltages with different phase waveforms 406, 408 (see FIG. 10c). Under the drive of the voltages, both PZT pieces 321 will contract gradually and then back to its initial position during a same half period, and when the voltages go to next half period, both PZT pieces 321 will expand and then back to its initial position. Similarly, the slider 31 is thus circularly rotate about the initial axis 501 to attain a fine head position adjustment.

Figure 11:
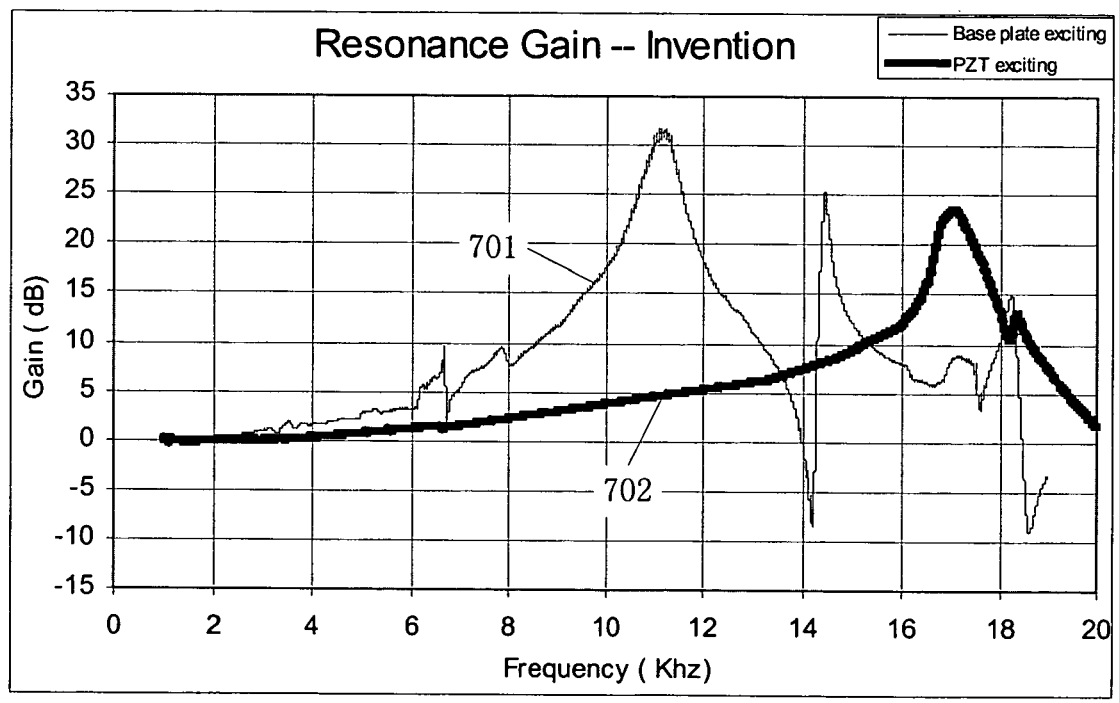
FIG. 11 shows a resonance curve of the HGA of FIG. 3.

FIG. 11 show a testing result of the resonance performance of the HGA of the invention, here, 701 represents a base plate exciting resonance curve, and 702 represents a micro-actuator exciting resonance curve. It shows that a suspension resonance has not happened in a low frequency, but only a pure micro-actuator resonance happened in a high frequency when exciting the PZT micro-actuator 32, this would enlarge the servo bandwidth and improve the capacity of the HDD, reduce the slider seeking and settling time.

Figure 12:
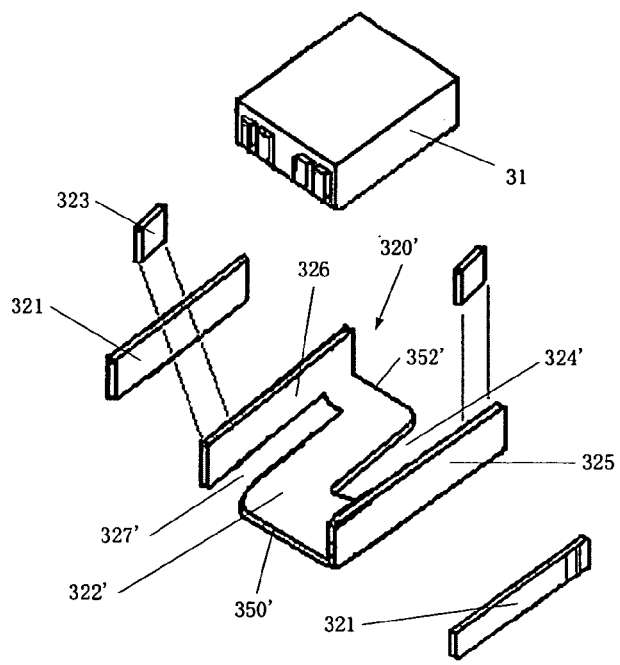
FIG. 12 is an exploded, perspective view of the micro-actuator and the slider of the HGA in FIG. 3 according to a second embodiment of the present invention.
Figure 13:
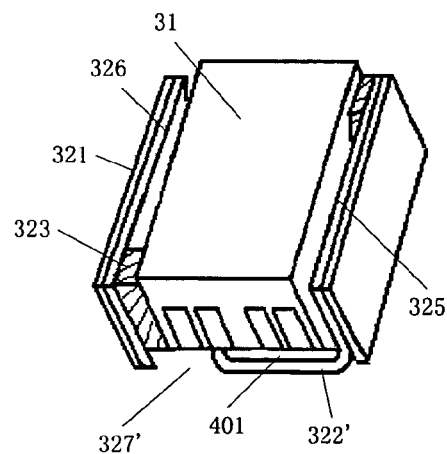
FIG. 13 shows the assembled micro-actuator and the slider of FIG. 12.

According to another embodiment of the invention, referring to FIGS. 12 and 13, a micro-actuator comprises two PZT pieces 321 and a support frame 320' having a bottom plate 322' and two side plates 325, 326. The bottom plate 322' have two ends 350' and 352', and a notch 324' starting from the end 352' is formed on a connecting portion between the bottom plate 322' and the side plate 325, while a notch 327' starting from the end 350' is formed on a connecting portion between the bottom plate 322' and the side plate 326. The slider 31 is partially coupled with the support frame 320' by two epoxy dots 323, in an embodiment, one epoxy dot 323 is positioned on an end of the side plate 325 adjacent to the end 352' of the support frame 320', and the other is positioned on an end of the side plate 326 adjacent to the end 350' of the support frame 320'. Also, there is a parallel gap 401 formed between the slider 31 and the support frame 320'.

Figure 14:
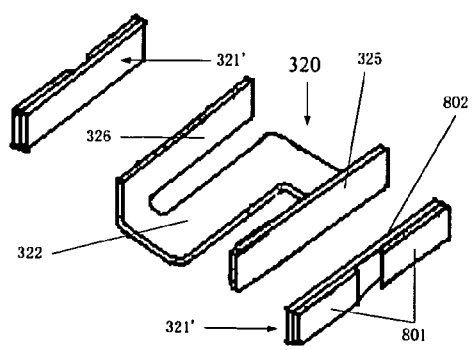
FIG. 14 is an exploded, perspective view of a micro-actuator according to a third embodiment of the present invention.
Figure 15:
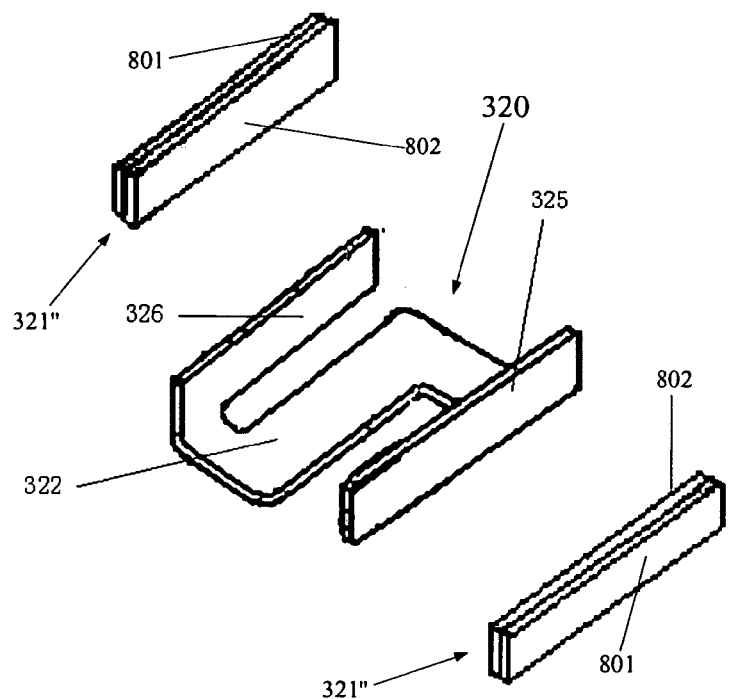
FIG. 15 is an exploded, perspective view of a micro-actuator according to a fourth embodiment of the present invention.

According to a third embodiment of the invention, referring to FIG. 15, a micro-actuator comprises two PZT pieces 321" and a support frame 320 having a bottom plate 322 and two side plates 325, 326. Each of the PZT pieces 321" has a multi-layer structure, which comprises an inner substrate layer 802, and an outer PZT layer 801. The substrate layer 802 can be made of ceramic, polymer or metal. The out PZT layer 801 can be a single layer PZT element or a multi-layer PZT element. Referring to FIG. 14, in a fourth embodiment, the PZT pieces 321' not only has a multi-layer structure (consisting of an out PZT layer 801 and an inner substrate layer 802), but the outer PZT layer 801 consists of a plurality of PZT segments (multi-segment structure). Such structures of the PZT pieces can attain not only good resonance performance and good stability, but also a fine head position adjustment.

Figure 16:
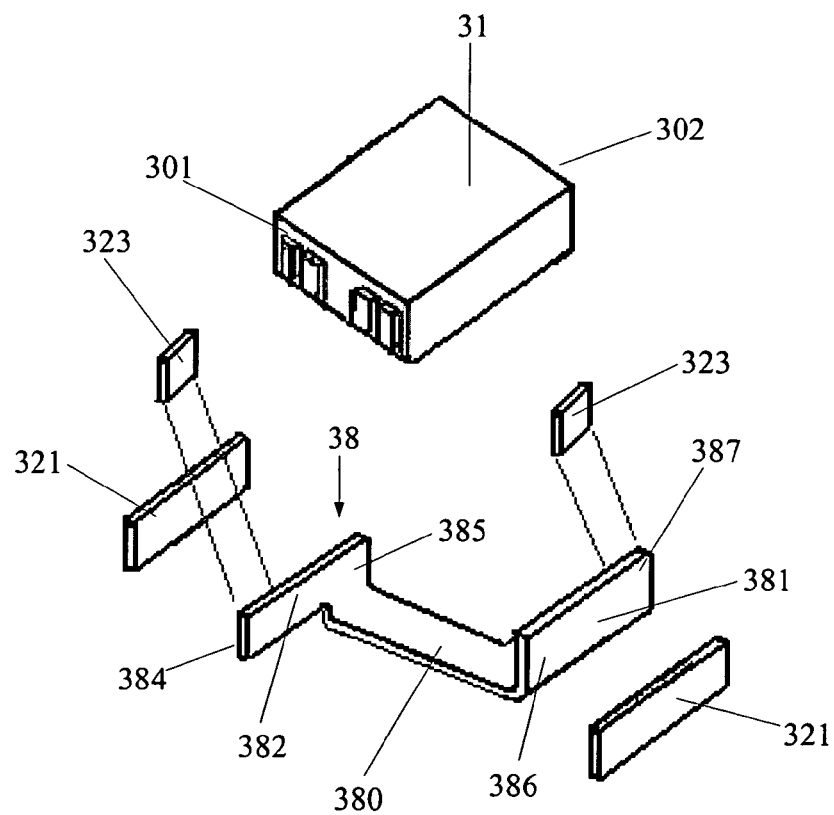
FIG. 16 is an exploded, perspective view of a micro-actuator and the slider according to a five embodiment of the present invention.
Figure 17:
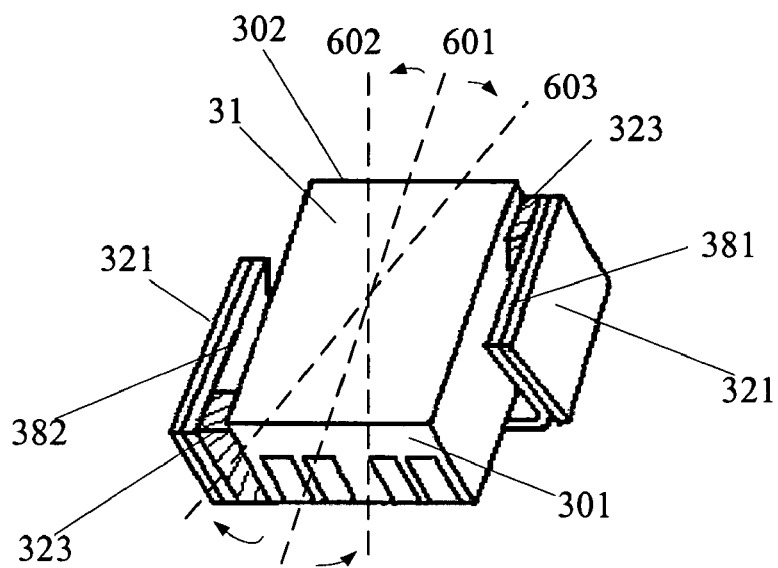
FIG. 17 shows the assembled micro-actuator and the slider of FIG. 16.

According to a five embodiment of this invention, referring to FIGS. 16 and 17, the micro-actuator also comprises a support frame 38 and two PZT pieces 321. The support frame 38 comprises a bottom plate 380 and two side plates 381 and 382 extending from the bottom plate 380 vertically. The side plate 381 has two ends 386 and 387, the end 386 connects with the bottom plate 380 and the end 387 is a free end. Similarly, the side plate 382 has an end 385 connecting with the bottom plate 380 and an end 384 is a free end. The slider 31 is mounted on the support frame 38 by disposing two epoxy dots 323 between the free ends 384, 387 and the slider 31. The free end 384 is adjacent to trailing edge 301 of the slider 31 and the free end 387 is adjacent to leading edge 302 of the slider 31. The slider 31 is bonded with the free ends 384, 387 by its two opposing side surface, one is trailing edge side surface and the other is leading edge side surface. A parallel gap (not labeled) about 30~50 microns exists between the slider 31 and the bottom plate 380 of the support frame 38, this is going to keep the slider 31 rotate freely from its original position 601 to a largest displacement location 602 or 603 when exciting the micro-actuator. In the embodiment, each of the PZT pieces 321 may be a single-layer PZT element or a multi-layer PZT element. Selectively, the PZT piece 321 has a multi-layer structure and/or a multi-segment structure.

Figure 18:
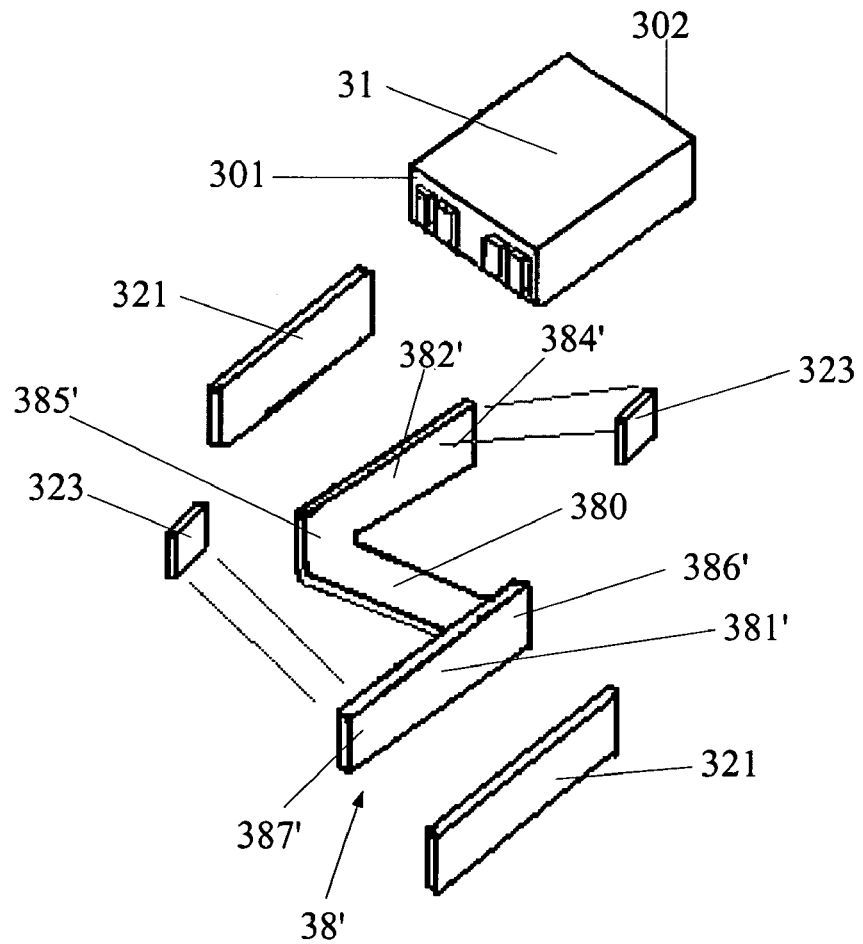
FIG. 18 is an exploded, perspective view of a micro-actuator and the slider according to a six embodiment of the present invention.
Figure 19:
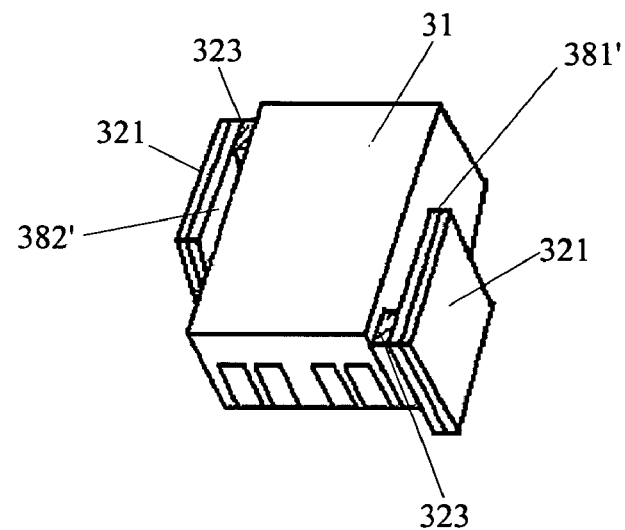
FIG. 19 shows the assembled micro-actuator and the slider of FIG. 18.

According to a six embodiment of this invention, referring to FIGS. 18 and 19, a micro-actuator comprises a support frame 38' and two PZT pieces 321. The support frame 38' comprises a bottom plate 380 and two side plates 381' and 382' extending from the bottom plate 380 vertically. The side plate 381' has two ends 386' and 387', the end 386' connects with the bottom plate 380 and the end 387' is a free end. Similarly, the side plate 382' has an end 385' connecting with the bottom plate 380 and the end 384' is a free end. The slider 31 is mounted on the support frame 38' by disposing two epoxy dots 323 between the free ends 384', 387' and the slider 31. The free end 384' is adjacent to the leading edge 302 of the slider 31 and the free end 387' is adjacent to the trailing edge 301 of the slider 31. A parallel gap (not labeled) about 30~50 microns exists between the slider 31 and the bottom plate 380 of the support frame 38', this is going to keep the slider 31 rotate freely with a central portion of the slider 31 as an axis when exciting the micro-actuator. In the embodiment, each of the PZT pieces 321 may be a single-layer PZT element or a multi-layer PZT element. Selectively, the PZT piece 321 has a multi-layer structure and/or a multi-segment structure.

Figure 20:
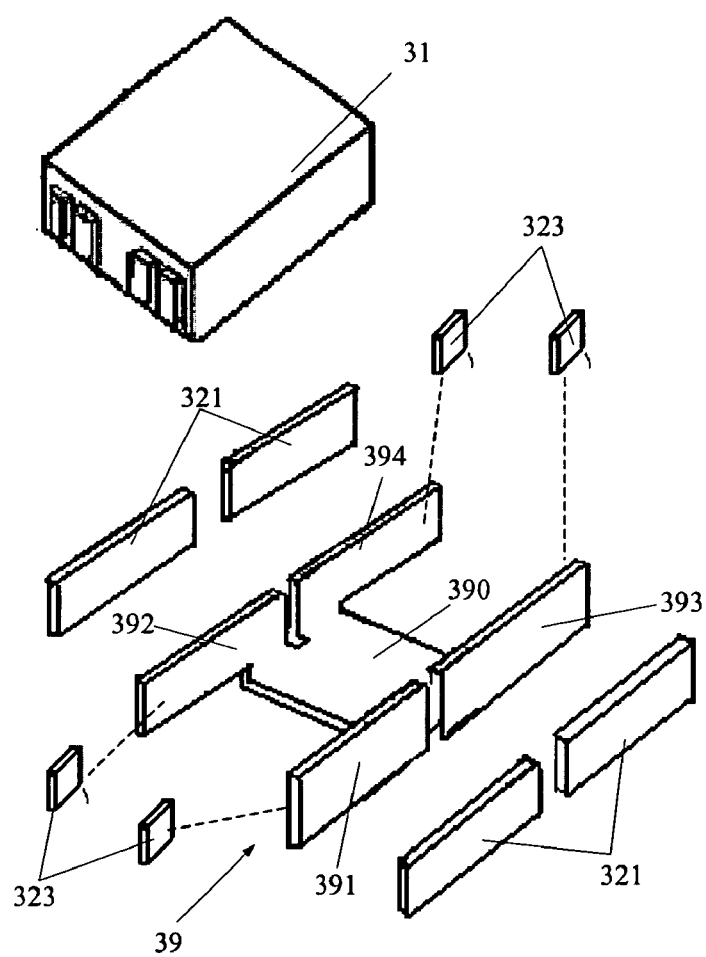
FIG. 20 shows an exploded micro-actuator and the slider according to a seven embodiment of the present invention.

According to a seven embodiment of this invention, referring to FIG. 20, a micro-actuator comprises a support frame 39 and four PZT pieces 321. The support frame 39 has a bottom plate 390 and four side plates 391, 392, 393, 394 extending from the bottom plate 390 vertically. Each of the side plate 391, 392, 393, 394 has two ends, one of which connects with the bottom plate 390 and the other is a free end. The slider 31 is mounted on the support frame 39 by disposing four epoxy dots 323 between the free ends of the four side plates 391, 392, 393, 394 and the slider 31. When exciting the PZT pieces 321, the four side plates 391, 392, 393, 394 will be bent so that the side plates 391, 394 of the support frame 39 will generate a rotate torque while the side plates 392, 393 will generate another rotate torque. Under the two rotate torques of the support frame 39, the slider 31 may rotate freely with a central portion of the slider as an axis. In the embodiment, each of the PZT pieces 321 may be a single-layer PZT element or a multi-layer PZT element. Selectively, the PZT piece 321 has a multi-layer structure and/or a multi-segment structure. A parallel gap of 30~50 microns exists between the slider 31 and the bottom plate 390 of the support frame 39. This is going to keep the slider 31 rotate freely when exciting the micro-actuator.

Compared with the prior art, the micro-actuator can rotate both trailing side and leading side of the slider in different directions, while the micro-actuator of the prior art can only move trailing side of the slider like a swing (because its leading side is fixed). So, the present invention can make the slider get a bigger swing than the prior art because both trailing and leading side of the slider can move. Accordingly, a big head position adjustment capacity can be attained.

Figure 21:
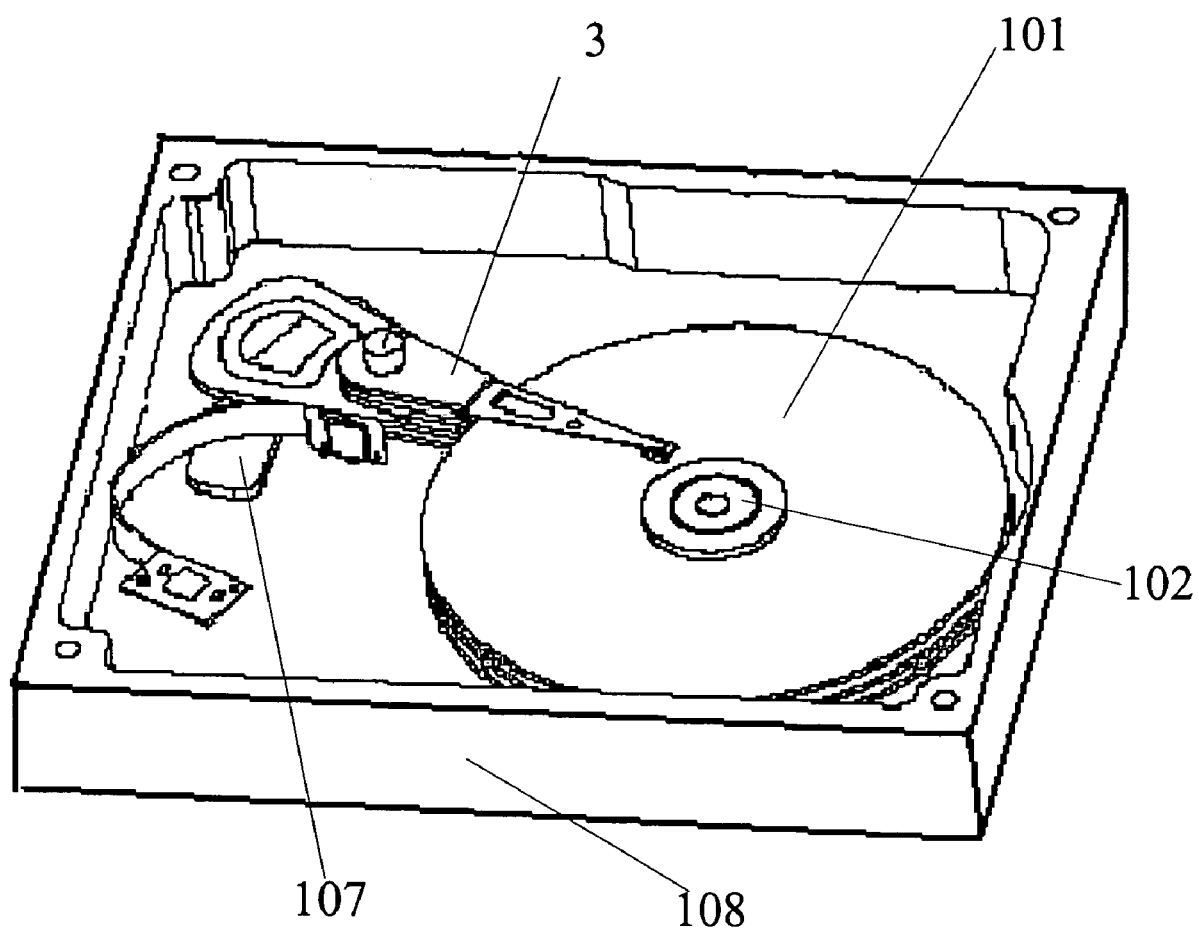
FIG. 21 is perspective view of a disk drive unit according to an embodiment of the invention.

In the present invention, referring to FIG. 21, a disk drive unit of the present invention can be attained by assembling a housing 108, a disk 101, a spindle motor 102, a VCM 107 with the HGA 3 of the present invention. Because the structure and/or assembly process of disk drive unit of the present invention are well known to persons ordinarily skilled in the art, a detailed description of such structure and assembly is omitted herefrom.

What is claimed is:

1. A head gimbal assembly comprising:
a slider;
a rotatable micro-actuator; and
a suspension to load the slider and the rotatable micro-actuator;
wherein the rotatable micro-actuator horizontally rotates the slider with a central portion of the slider as a rotation center; and
wherein the rotatable micro-actuator comprises:
a bottom plate to be connected with the suspension;
two arm plates symmetrically disposed on the bottom plate with a central portion of the bottom plate as a symmetry point; and
at least one piezoelectric pieces to be connected with the arm plates;
wherein the two arm plates are connected with each other only at one end of each arm plate by the bottom plate.

2. A head gimbal assembly comprising:
a slider;
a rotatable micro-actuator; and
a suspension to load the slider and the rotatable micro-actuator;
wherein the rotatable micro-actuator horizontally rotates the slider with a central portion of the slider as a rotation center; and
wherein the rotatable micro-actuator comprises;
a bottom plate to be connected with the suspension; four arm plates symmetrically disposed on the bottom plate with a central portion of the bottom plate as symmetry point; and
four piezoelectric pieces to be connected with the four arm plates, respectively.

3. The head gimbal assembly as claimed in claim 1, wherein the arm plates are perpendicularly connected with the bottom plate.

4. The head gimbal assembly as claimed in claim 1, wherein each arm plate has a free end and an end to connect with the bottom plate.

5. The head gimbal assembly as claimed in claim 1, wherein the slider is partially bonded with the rotatable micro-actuator.

6. The head gimbal assembly as claimed in claim 5, wherein the slider is bonded with the free ends of the arm plates respectively by its two opposing side surface, one is trailing edge side surface and the other is leading edge side surface.

7. The head gimbal assembly as claimed in claim 1, wherein a parallel gap exists between the suspension and the bottom plate.

8. The head gimbal assembly as claimed in claim 1, wherein the bottom plate is connected with the suspension by epoxy, adhesive, ACF or laser welding.

9. The head gimbal assembly as claimed in claim 1, wherein the at least one piezoelectric pieces are thin film piezoelectric pieces or ceramic piezoelectric pieces, which are electrically bonded with the suspension by gold ball bonding, solder ball bonding or conductive adhesive.

10. The head gimbal assembly as claimed in claim 1, wherein the at least one piezoelectric pieces have a single-layer structure or a multi-layer structure comprising a substrate layer and a piezoelectric layer.

11. The head gimbal assembly as claimed in claim 10, wherein the piezoelectric layer is a single-layer PZT structure or a multi-layer PZT structure, the substrate layer is made of metal, ceramic, or polymer.

12. The head gimbal assembly as claimed in claim 1, wherein the at least one piezoelectric pieces have a single-segment structure or a multi-segment structure.

13. A micro-actuator comprising:
a bottom plate to be connected with a suspension;
two arm plates symmetrically disposed on the bottom plate with a central portion of the bottom plate as symmetry point; and,
at least one piezoelectric pieces to be connected with the arm plates, wherein
the two arm plates are connected with each other only at one end of each arm plate by the bottom plate.

14. The micro-actuator as claimed in claim 13, wherein the arm plates are perpendicularly connected with the bottom plate.

15. The micro-actuator as claimed in claim 13, wherein the at least one piezoelectric pieces are thin film piezoelectric pieces or ceramic piezoelectric pieces.

16. The micro-actuator as claimed in claim 13, wherein the at least one piezoelectric pieces have a single-layer structure or a multi-layer structure comprising a substrate layer and a piezoelectric layer.

17. The micro-actuator as claimed in claim 16, wherein the piezoeleetric layer is a single-layer PZT structure or a multi-layer PZT structure, the substrate layer is made of metal, ceramic, or polymer.

18. The micro-actuator as claimed in claim 13, wherein the at least one piezoelectric pieces have a single-segment structure or a multi-segment structure.

19. A micro-actuator comprising:
a bottom plate to be connected with a suspension;
four arm plates symmetrically disposed on the bottom plate with a central portion of the bottom plate as symmetry point; and
four piezoelectric pieces to be connected with the four arm plates, respectively.

20. A disk drive unit comprising:
a head gimbal assembly; wherein the head gimbal assembly comprise
a slider;
a rotatable micro-actuator; and
a suspension to load the slider and the rotatable micro-actuator;
wherein the rotatable micro-actuator horizontally rotates the slider with a central portion, of the slider as a rotation center;
a drive arm to connect with the head gimbal assembly;
a disk; and
a spindle motor to spin the disk;
wherein the rotatable micro-actuator comprises:
a bottom plate to be connected with the suspension;
two arm plates symmetrically disposed on the bottom plate with a central portion of the bottom elate as symmetry point; and
at least one piezoelectric pieces to be connected with the arm plates;
wherein the two arm plates are connected with each other only at one end of each arm plate by the bottom plate.

21. A disk drive unit comprising:
a head gimbal assembly; wherein the head gimbal assembly comprise:
a slider;
a rotatable micro-actuator; and
a suspension to load the slider and the rotatable micro-actuator;
wherein the rotatable micro-actuator horizontally rotates the slider with a central portion of the slider as a rotation center;
a drive arm to connect with the head gimbal assembly;
a disk; and
a spindle motor to spin the disk;
wherein the rotatable micro-actuator comprises:
a bottom plate to be connected with the suspension; four arm plates symmetrically disposed on the bottom plate with a central portion of the bottom plate as symmetry point; and
four piezoelectric pieces to be connected with the four arm plates, respectively.

* * * * *